US009998957B2

(12) United States Patent
Roeland et al.

(10) Patent No.: US 9,998,957 B2
(45) Date of Patent: Jun. 12, 2018

(54) MINIMISATION OF HANDOVER GAP TIME IN THE CONTEXT OF S2A IP SESSION MOBILITY

(71) Applicant: Telefonaktiebolaget L M Ericsson (publ), Stockholm (SE)

(72) Inventors: Dinand Roeland, Sollentuna (SE); Kaiyuan Huang, Kanata (CA); Juying Gan, Shanghai (CN); Stefan Rommer, Västra Frölunda (SE); Chengqiong Xie, Shanghai (CN); Deqin Zhan, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 25 days.

(21) Appl. No.: 14/769,234

(22) PCT Filed: Feb. 17, 2014

(86) PCT No.: PCT/SE2014/050190
§ 371 (c)(1),
(2) Date: Aug. 20, 2015

(87) PCT Pub. No.: WO2014/168549
PCT Pub. Date: Oct. 16, 2014

(65) Prior Publication Data
US 2016/0007236 A1    Jan. 7, 2016

(30) Foreign Application Priority Data

Feb. 22, 2013    (WO) ............... PCT/CN2013/071752

(51) Int. Cl.
H04W 36/00    (2009.01)
H04W 36/14    (2009.01)
(Continued)

(52) U.S. Cl.
CPC . *H04W 36/0011* (2013.01); *H04L 2012/5618* (2013.01); *H04W 36/14* (2013.01); *H04W 36/18* (2013.01)

(58) Field of Classification Search
CPC . H04W 36/00; H04W 36/0011; H04W 34/14; H04W 36/02
See application file for complete search history.

(56) References Cited

U.S. PATENT DOCUMENTS

| 2008/0318546 | A1* | 12/2008 | Kitazoe | H04L 63/068 455/410 |
| 2010/0246530 | A1* | 9/2010 | Pehrsson | H04W 36/0022 370/331 |
| 2013/0208700 | A1* | 8/2013 | Lim | H04W 36/0061 370/331 |

OTHER PUBLICATIONS

3GPP, "3rd Generation Partnership Project; Technical Specification Group Services and System Aspects; Architecture enhancements for non-3GPP accesses (Release 11)", 3GPP TS 23.402 V11.4.0, Sep. 2012, 1-252.

(Continued)

*Primary Examiner* — Anez Ebrahim
(74) *Attorney, Agent, or Firm* — Patent Portfolio Builders, PLL

(57) ABSTRACT

A method in a communication network for facilitating handover of a user equipment (UE) from access via a source access path to access via a target access path is provided. An internet protocol (IP) access is provided to the UE via the source access path and an indication that the UE has configured a communication interface for the target access path is obtained. Switching from providing IP access via the source access path to providing IP access to the UE via the target access path is performed. Further, instructions for releasing communication resources for the source access path are sent after the indication that the communication interface has been configured for the target access path is obtained.

12 Claims, 13 Drawing Sheets

(51) Int. Cl.
*H04L 12/70* (2013.01)
*H04W 36/18* (2009.01)

(56) References Cited

OTHER PUBLICATIONS

3GPP, "3rd Generation Partnership Project; Technical Specification Group Services and System Aspects; Study on S2a Mobility based on GTP & WLAN access to EPC (SaMOG); Stage 2 (Release 12)", 3GPP TR 23.852 V1.3.0, Nov. 2012, 1-122.
Rayment, Stephen et al., "Achieving Carrier-Grade Wi-Fi in the 3GPP World", Ericsson Review, available online at URL:http://www.ericsson.com/res/thecompany/docs/publications/ericsson review/2012/er-seamless-wi-fi-roaming.pdf, Feb. 7, 2012.
Unknown, Author, "Avoiding Bearer Release Confliction upon E-UTRAN<->HRPD Handover", Huawei, 3GPP TSG SA WG2 Meeting #64, TD S2-082226, Jeju Island, South Korea, Apr. 7-11, 2008, 1-3.
Unknown, Author, "SaMOG phase 2 solution", Ericsson et al., 3GPP TSG SA WG2 Meeting #94, TD S2-124768 (was S2-124375), New Orleans, USA, Nov. 12-16, 1-13.
Unknown, Author, "User Plane handling in EUTRAN to HRPD HO", Nokia Siemens Networks et al., 3GPP TSG SA WG2 Meeting #61, S2-075161, Ljubljana, Slovenia, Nov. 12-16, 2007, 1-13.

\* cited by examiner

MINIMISATION OF HANDOVER GAP TIME IN THE CONTEXT OF S2A IP SESSION MOBILITY

TECHNICAL FIELD

The present disclosure relates to methods and devices for facilitating handover of a user equipment (UE) from access via a source access path to access via a target access path.

BACKGROUND

The standardization organization 3rd Generation Partnership Project (3GPP) has an ongoing work item Study on S2a Mobility based On GTP & WLAN access to EPC (SaMOG; see 3GPP technical report (TR) 23.852, particularly version 1.3.0 and later). This work item proposes an architecture, where a Trusted WLAN (Wireless Local Area Network) Access Network (TWAN) is connected to an EPC (Evolved Packet Core) via the S2a reference point. Further details can be found in 3GPP TS 23.402 (see particularly revision 11.4.2 or later, section 16.1).

The TWAN is further divided into functional units (see 3GPP TS 23.402 section 16.1.2 for further details). The Trusted WLAN Access Gateway (TWAG) terminates the Sea interface. The WLAN Access Network is a collection of one or more Access Points (AP). Each AP terminates the User Equipment's (UE's) IEEE 802.11 WLAN, e.g. WiFi, air link. A UE is a user device. The term User Equipment (UE) is used interchangeably herein in place of the term mobile terminal or mobile phone, or even just a terminal or device.

Parts of SaMOG have already been released in the 3GPP specifications as part of Release ii (Rel-11). SaMOG Rel-11 does not place any new requirements on the UE. As a consequence, handover with Internet Protocol (IP) address preservation between a UE's 3GPP access and WLAN access is not possible in Rel-11 In the ongoing SaMOG Rel-12 study, new requirements may be placed on the UE. In this way, it will be possible to achieve handover with IP address preservation between a UE's 3GPP access and WLAN access. However, there is still a need to find optimized solutions.

SUMMARY

It is an object to enable a seamless handover from one access to another. Such seamless handover may not be visible to the application.

According to an aspect of the present disclosure, there is provided a method in a communication network for facilitating handover of a UE from access via a source access path to access via a target access path. The method comprises providing internet protocol (IP) access to the UE via the source access path. The method also comprises obtaining an indication that the UE has configured a communication interface for the target access path. The method also comprises switching from the providing IP access via the source access path to providing IP access to the UE via the target access path. The method also comprises sending instructions for releasing communication resources for the source access path, after the obtaining an indication that the communication interface has been configured for the target access path.

According to another aspect of the present disclosure, there is provided a computer program product comprising computer-executable components for causing a network node in a communication network to perform an embodiment of a method of the present disclosure when the computer-executable components are run on processor circuitry comprised in the network node.

According to another aspect of the present disclosure, there is provided a network node for a communication network. The network node comprises processor circuitry, and a storage unit storing instructions that, when executed by the processor circuitry, cause the network node to provide IP access to a UE via a source access path. The instructions also cause the network node to obtain an indication that the UE has configured a communication interface for a target access path. The instructions also cause the network node to switch from the providing IP access via the source access path to providing IP access to the UE via the target access path. The instructions also cause the network node to send instructions for releasing communication resources for the source access path, after the obtaining an indication that the communication interface has been configured for the target access path.

According to another aspect of the present disclosure, there is provided a computer program for facilitating handover in a communication network of a UE from access via a source access path to access via a target access path. The computer program comprises computer program code which is able to, when run on processor circuitry of a network node in the communication network, cause the network node to provide IP access to the UE via the source access path. The code is also able to cause the network node to obtain an indication that the UE has configured a communication interface for the target access path. The code is also able to cause the network node to switch from the providing IP access via the source access path to providing IP access to the UE via the target access path. The code is also able to cause the network node to send instructions for releasing communication resources for the source access path, after the obtaining an indication that the communication interface has been configured for the target access path.

According to another aspect of the present disclosure, there is provided a method performed by a UE, served by a communication network, for facilitating handover of the UE from access via a source access path to access via a target access path. The method comprises having/obtaining IP access via the source access path. The method also comprises configuring a communication interface of the UE for the target access path while still having the IP access via the source access path. The method also comprises sending an indication that the communication interface has been configured for the target access path, to a network node of the communication network. The method also comprises obtaining IP access via the target access path after having sent the indication.

According to another aspect of the present disclosure, there is provided a UE. The UE comprises processor circuitry, a communication interface, and a storage unit storing instructions that, when executed by the processor circuitry, cause the UE to have/obtain IP access via a source access path. The instructions also cause the UE to configure the communication interface of the UE for a target access path while still having IP access via the source access path. The instructions also cause the UE to send an indication that the communication interface has been configured for the target access path, to a network node of the communication network. The instructions also cause the UE to obtain IP access via the target access path after having sent the indication.

According to another aspect of the present disclosure, there is provided a computer program product comprising an embodiment of a computer program in accordance with the present disclosure and a computer readable means on which the computer program is stored.

By waiting with releasing the recourses for the source access path, thereby disabling the source access path, until having received an indication that the UE has configured its communication interface for the target access path, the risk of loss of data during the handover is reduced and an application communicating with, e.g. providing a service to, the UE may be kept agnostic of and/or unaffected by the handover. The handover is from a source access path to a target access path. An access path is typically a radio access technology (RAT) used by a radio access network (RAN), and may e.g. be a cellular RAT in accordance with a 3GPP standard or a WLAN RAT in accordance with an IEEE standard.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

Figure 1:
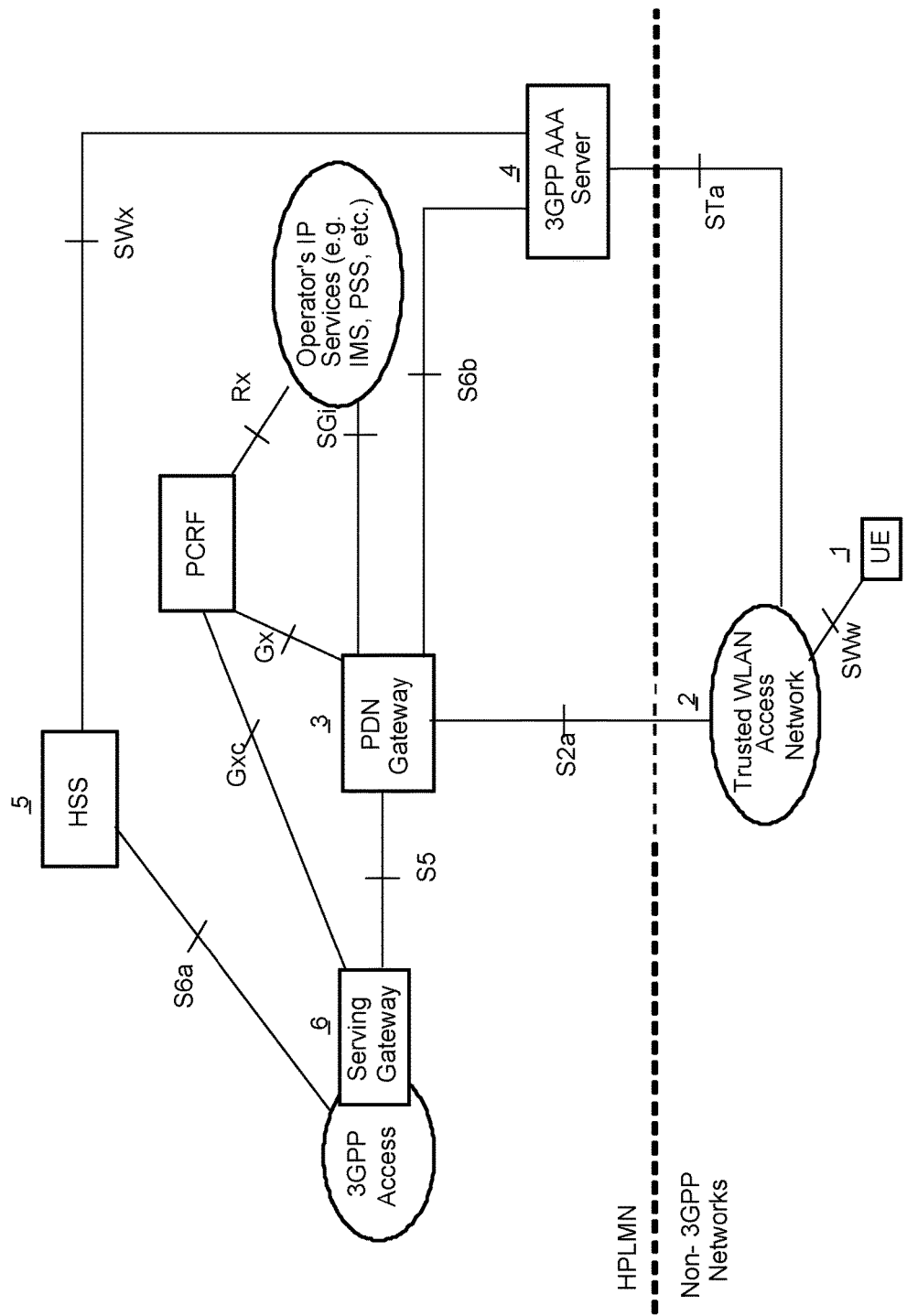
FIG. 1 illustrates in a block diagram an exemplary architecture for TWAN access to EPC.

FIG. 1 illustrates the architecture proposed by the 3GPP SaMOG. A TWAN 2 is connected to an EPC via the S2a interface. More specifically, the TWAN serves the UE 1 and is connected to the PDN gateway 3, as well as to the 3GPP AAA server 4 over the STa interface. The PDN gateway is in its turn connected to e.g. the serving gateway 6 which is in contact with the home subscriber server (HSS) 5 of the cellular 3GPP operator network.

Figure 2:
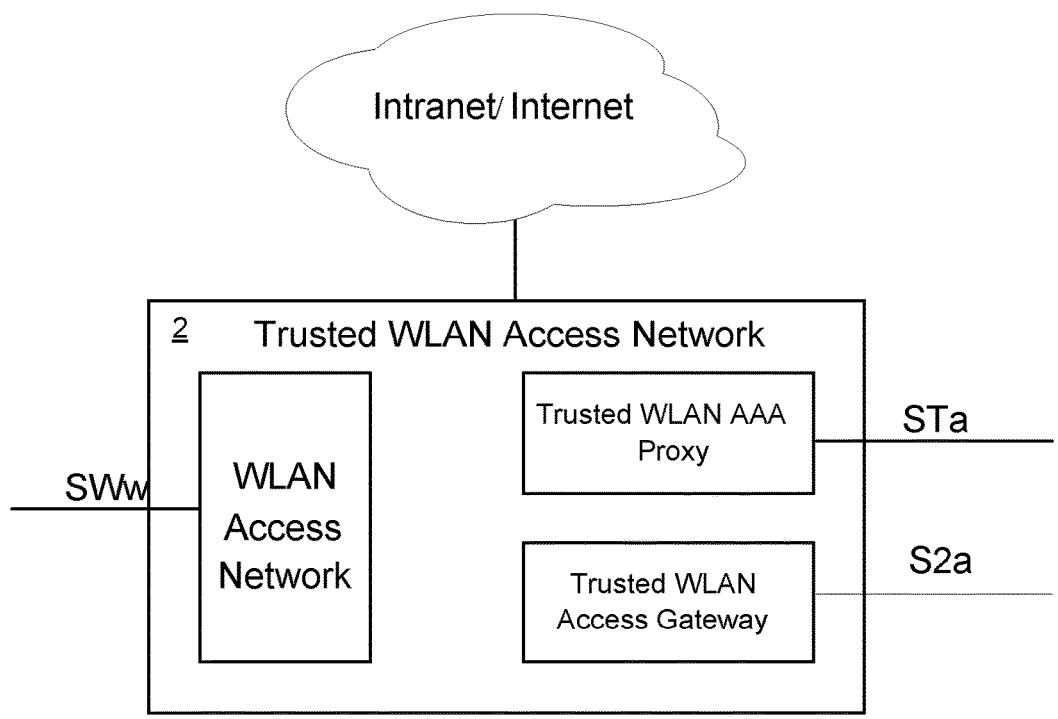
FIG. 2 illustrates in a block diagram an exemplary Trusted WLAN Access Network functional split.

FIG. 2 illustrates functional units of the TWAN 2 in accordance with the architecture of FIG. 1. The Trusted WLAN Access Gateway (TWAG) terminates the S2a interface. The WLAN Access Network is a collection of one or more Access Points (AP). Each AP terminates the UE Institute of Electrical and Electronics Engineers (IEEE) 802.11 air link.

Below follow some more detailed discussions of some embodiments of the present disclosure, with reference to signalling diagrams of FIGS. 3-10. It should be noted that the signalling shown may not be exhaustive, i.e. other messages may also be sent although not explicitly shown, e.g. as part of standard signalling.

Within the SaMOG Rel-12 study, a number of solutions for handover with IP address preservation have been proposed (see 3GPP TR 23.852 section 8.2). One solution (see 3GPP 23.852 section 8.2.1) proposes to support two scenarios: one scenario where multiple Packet Data Network (PDN) connections over WLAN are supported and one scenario where only a single PDN connection over WLAN is supported. A PDN connection can be defined as an IP tunnel between a UE 1 and a PDN gateway (PGW) 3.

Implementing the multi-PDN scenario is more difficult, because a means is needed to differentiate user plane signalling per PDN, and a means is needed to maintain (setup and teardown) an individual PDN connection.

Figure 3:
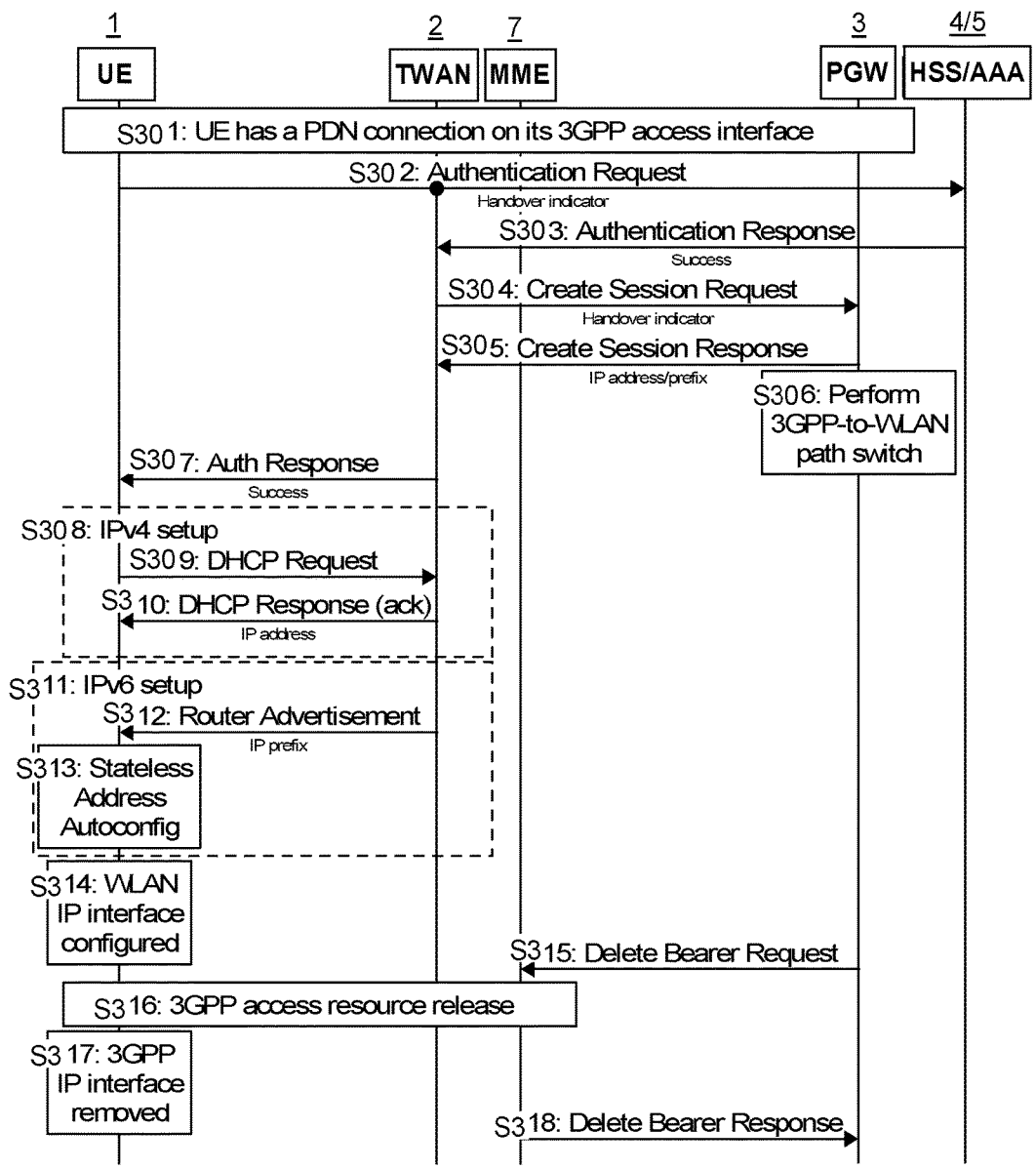
FIG. 3 illustrates in a signalling diagram an exemplary handover from 3GPP to WLAN with S2a tunnel setup triggered by authentication.

FIG. 3 shows a simplified call flow of a handover from 3GPP access to WLAN access in the single-PDN scenario. In such scenario, the S2a tunnel setup (step S304) is triggered by a successful authentication. As part of the authentication request (step S302), the UE 1 indicates that it wants to do a handover. After receiving an indication of successful authentication (step S307), the UE 1 continues to configure its WLAN access interface with an IPv4 address (block S308) and/or an IPv6 address (block S311). In block S308, it is assumed that Dynamic Host Configuration Protocol (DHCP) is performed. In the mean time, after step S306, the PGW 3 initiates the removal of the resources on the 3GPP side (steps S315-S318).

Figure 4:
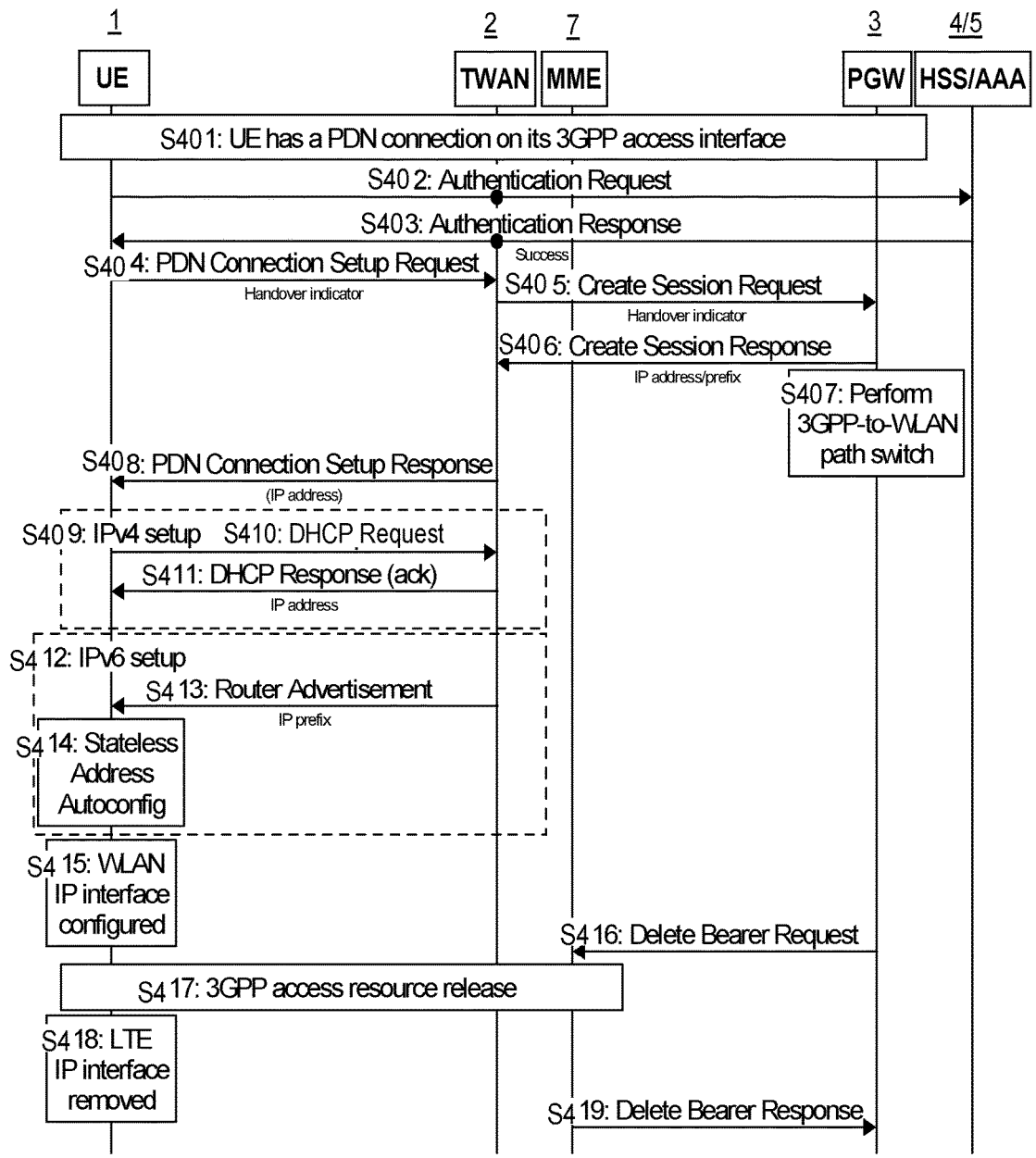
FIG. 4 illustrates in a signalling diagram an exemplary handover from 3GPP to WLAN with S2a tunnel setup triggered by control protocol.

FIG. 4 shows a simplified call flow of a handover from 3GPP access to WLAN access in the multiple-PDN scenario. In this particular example, only a single PDN connection is setup. However, steps S404-S419 may be repeated for additional PDN connections. In the multi-PDN scenario, setup of the S2a tunnel is triggered by a control protocol (step S404). Several variants of such control protocol are mentioned in 3GPP TS 23.852 section 8.2. All variants have in common the protocol is end-to-end between UE 1 and TWAG of the TWAN 2. The UE 1 continues to configure its WLAN access interface with an IPv4 address and/or IPv6 address (blocks S409 and S412, similar to previous FIG. 3). The UE 1 may also/alternatively receive its IPv4 address via the control protocol (step S408). In that case, block S409 can be omitted.

Figure 5:
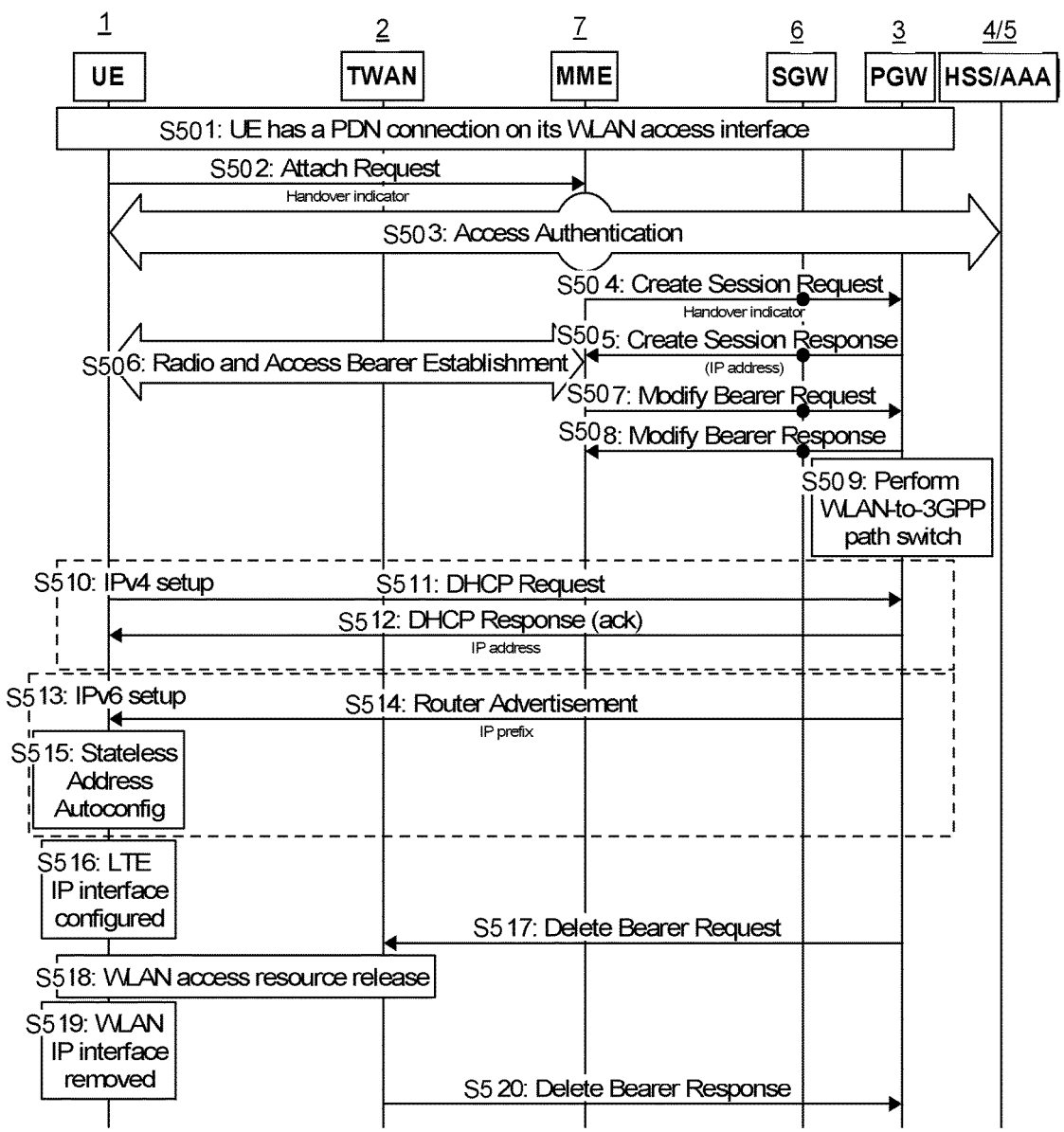
FIG. 5 illustrates in a signalling diagram an exemplary simplified call flow of a handover from WLAN to 3GPP.

FIG. 5 shows a simplified call flow of a handover from WLAN access to 3GPP access. The tunnel setup is performed in step S504, triggered by the attach request from the UE 1 (step S502). The attach request includes a handover indicator. The actual path switch (step S509) is not performed until the radio bearer is established (step S506). Path switch is triggered by a Modify Bearer Request (step S507). The UE configures its 3GPP access interface with an IPv4 address and/or IPv6 address (blocks S510 and S513, similar to previous FIG. 4). The UE 1 will normally receive its IPv4 address via radio bearer establishment signalling (step S506). In that case, block S510 can be omitted.

More detailed versions of the three call flows illustrated in FIGS. 3-5 can be found in 3GPP TR23.852. The three call flows are used as a basis for other call flows in the remaining part of this document, FIGS. 6-10. The call flow assumes an EPC (including nodes/functions such as PGW 3 and Mobility Management Entity (MME) 7), but the same principles apply to earlier 3GPP architectures like Universal Mobile Telecommunications System (UMTS; where e.g. a PGW 3 translates to a Gateway GPRS Support Node (GGSN)).

Referring again to FIG. 3 the following situation may occur. At step S314, the WLAN interface on the UE 1 is fully configured. At step S317 the Long-Term Evolution (LTE) interface on the UE 1 has been removed. Immediately after step S305 (Create Session Response), the PGW 3 executes step S306 (the path switch). Step S315 is executed immediately after step S306. But step S305 also triggers the execution of step S307, and the WLAN IP address configuration on the UE 1 (blocks S308 and S311). This implies that the removal of the 3GPP IP interface (step S317) may be finalized before the configuration of the WLAN IP interface (step S314) is finalized. In other words, there may be a period of time that the UE has no interface at all. In the remaining part of this document, this period of time is referred to as the "interface gap time".

It has been found that three particular problems may be listed that arise in the above described scenario:
1. During the interface gap time, The UE 1 will not be able to send uplink (UL) data.
2. From the time the PGW 3 has done the path switch (step S306), until the time the UE 1 has configured its WLAN IP interface (step S314), no downlink (DL) data can be sent.
3. In current UE implementations, the UE 1 interface chipset may inform the high-level operating system that no interface is available. As a consequence, the operating system will release all sockets of this interface. The applications using those sockets will notify this, and will have to take appropriate action; e.g. trying to setup the socket again once an interface becomes available.

In the remaining part of this document, the time that no uplink data can be sent is denoted "uplink outage time". The time that no downlink data can be sent is denoted "downlink outage time".

Laboratory measurements confirm that outage time may occur. In particular, the period of time from sending the Authentication Response from the TWAN 2 (step S307), until the TWAN 2 receiving the DHCP Request (step S309) may be about half a second. This time is spent on finalizing the authentication in the AP and the UE 1. The downlink outage time may therefore be approximately half a second. Uplink outage and interface gap time are expected to be in the same range. Real-time bi-directional streaming applications, like voice, may accept the loss of a couple of packets (milliseconds), but not half a second.

These laboratory measurements have been done in an IPv4-only setup (block S311 is omitted). No DHCP signals got lost—something which may happen in a real environment. In that case, a DHCP retransmission will occur after several seconds. This may increase the outage times. If the UE 1 would also setup an IPv6 address, then it may perform duplicate address detection (DAD, step S313). This time period may be in the order of several seconds. This would increase the outage times even more. It should be noted, though, that the UE 1 may be aware of the fact that the UE-TWAG link is point-to-point. In that case, DAD may be omitted. In error cases, a router advertisement may get lost. Typically, a router advertisement may be re-sent after several seconds. As mentioned for IPv4, this may increase the outage times.

Referring to FIG. 4, similar problems may occur as in the above scenario—although less extreme:
1. If only IPv4 is used, and no re-transmissions occur in block S409 (IPv4 setup), then step S415 (WLAN interface configured) and step S318 (3GPP interface removed) may finalize simultaneously. A difference from the scenario in FIG. 3 is that authentication is already performed. The interface gap time, uplink outage time and downlink outage time may therefore be reduced to virtually zero.
2. If there are re-transmissions in block S409 (IPv4 setup), or if IPv6 is used and DAD is performed, then similar problems as in FIG. 3 may arise.

Referring to FIG. 5, a better performance may be anticipated than in the scenario in FIG. 4 in the IPv4 case:
1. If only IPv4 is used, and the address is sent to the UE 1 by means of step S506 (radio bearer establishment), then there may be no interface gap or outage times at all. A reason is that the PGW 3 does not perform path switch until it has received an explicit indication that the UE 1 has configured its interface. This explicit indication is the Modify Bearer Request (step S507, triggered by step S506).
2. For IPv4 with address configuration via DHCP (block S510), and for IPv6, the same applies as in the scenario in FIG. 4.

The description below provides exemplary embodiments wherein the above mentioned problems with the scenarios of FIGS. 3 and 4 may be alleviated.

First Scenario: The following embodiments are considered in connection with handover from 3GPP access (also called cellular access or RAT) to WLAN when tunnel setup is triggered by authentication.

According to a first embodiment, the UE 1 delays informing its high-level operating system. During an ongoing handover, if an interface gap time occurs, the UE radio interface chipset may delay informing the high-level operating system about this. The sockets towards the application may then not be released. This may eliminate the interface gap time as seen from the application side.

This embodiment may not solve the uplink and downlink outage time problems. Also, this embodiment may only be applicable when the interface gap time is short—e.g. in the order of milliseconds. This embodiment may also assume that the 3GPP and WLAN chipsets are fairly integrated (e.g. both sides know that a handover is ongoing).

Figure 6:
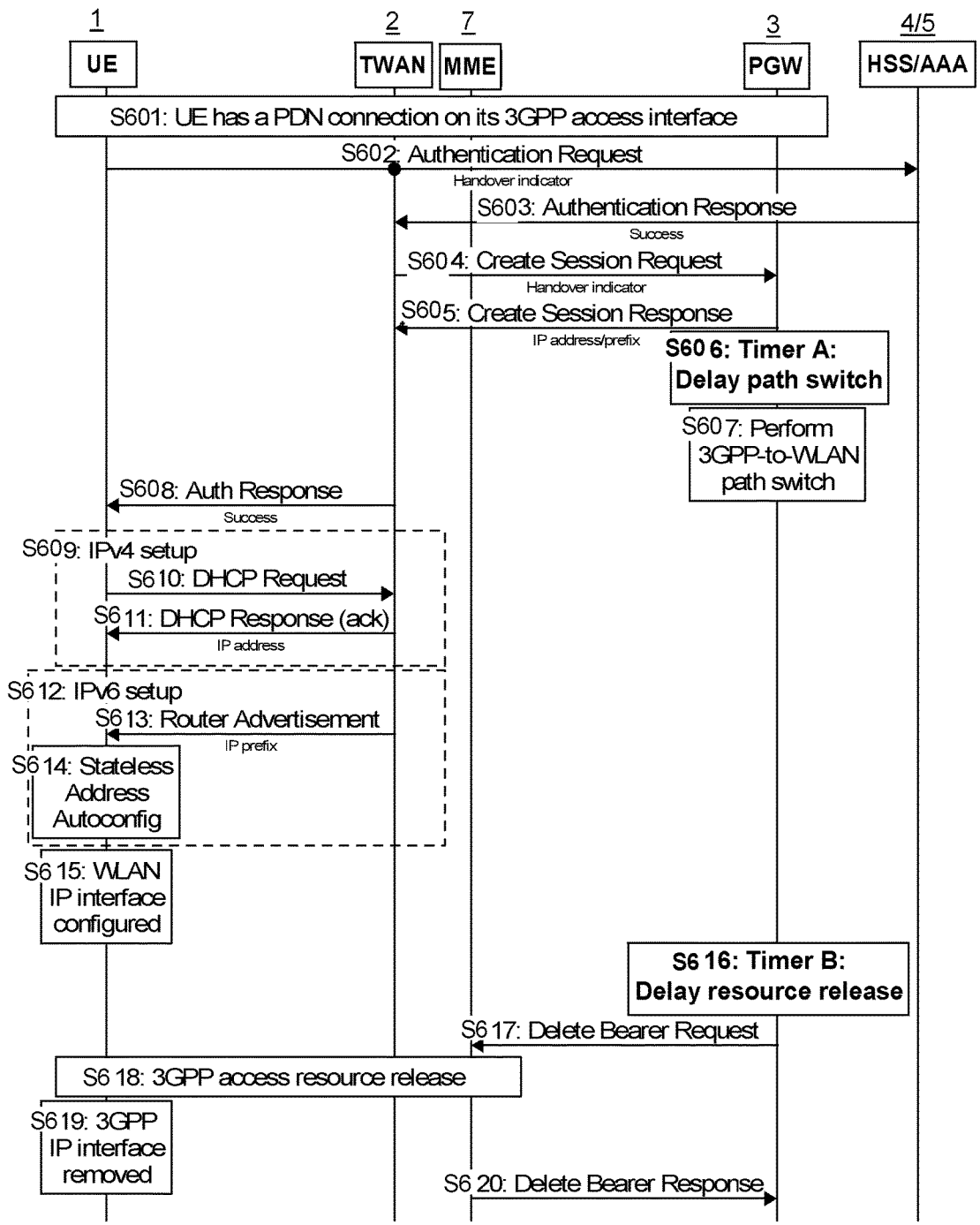
FIG. 6 illustrates schematically in a signalling diagram a handover from 3GPP to WLAN with S2a tunnel setup triggered by authentication, with PGW delaying path switch and 3GPP access resource release according to one embodiment.
Figure 7:
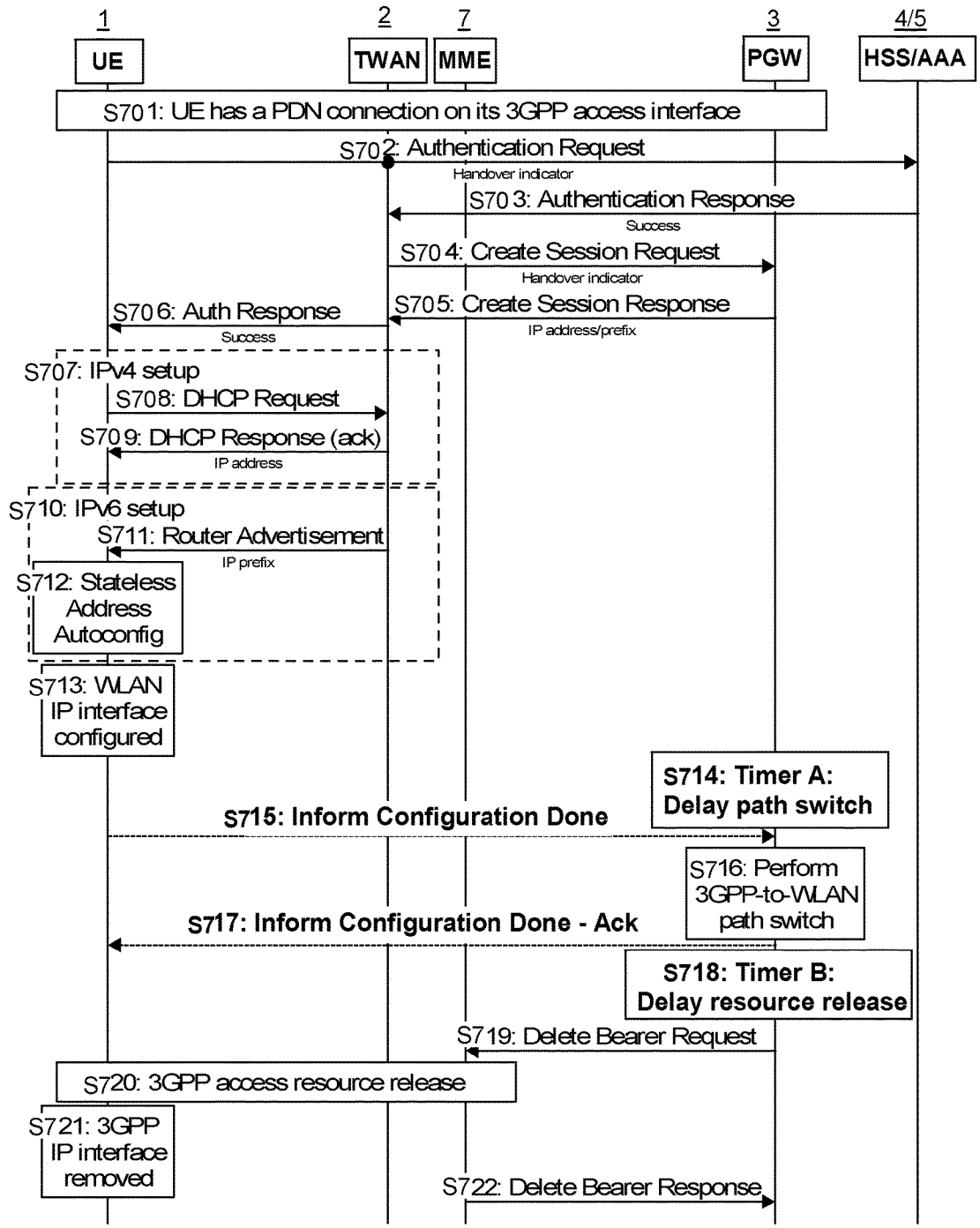
FIG. 7 illustrates schematically in a signalling diagram a handover from 3GPP to WLAN with S2a tunnel setup triggered by authentication, with UE informing PGW when interface is configured according to one embodiment.
Figure 8:
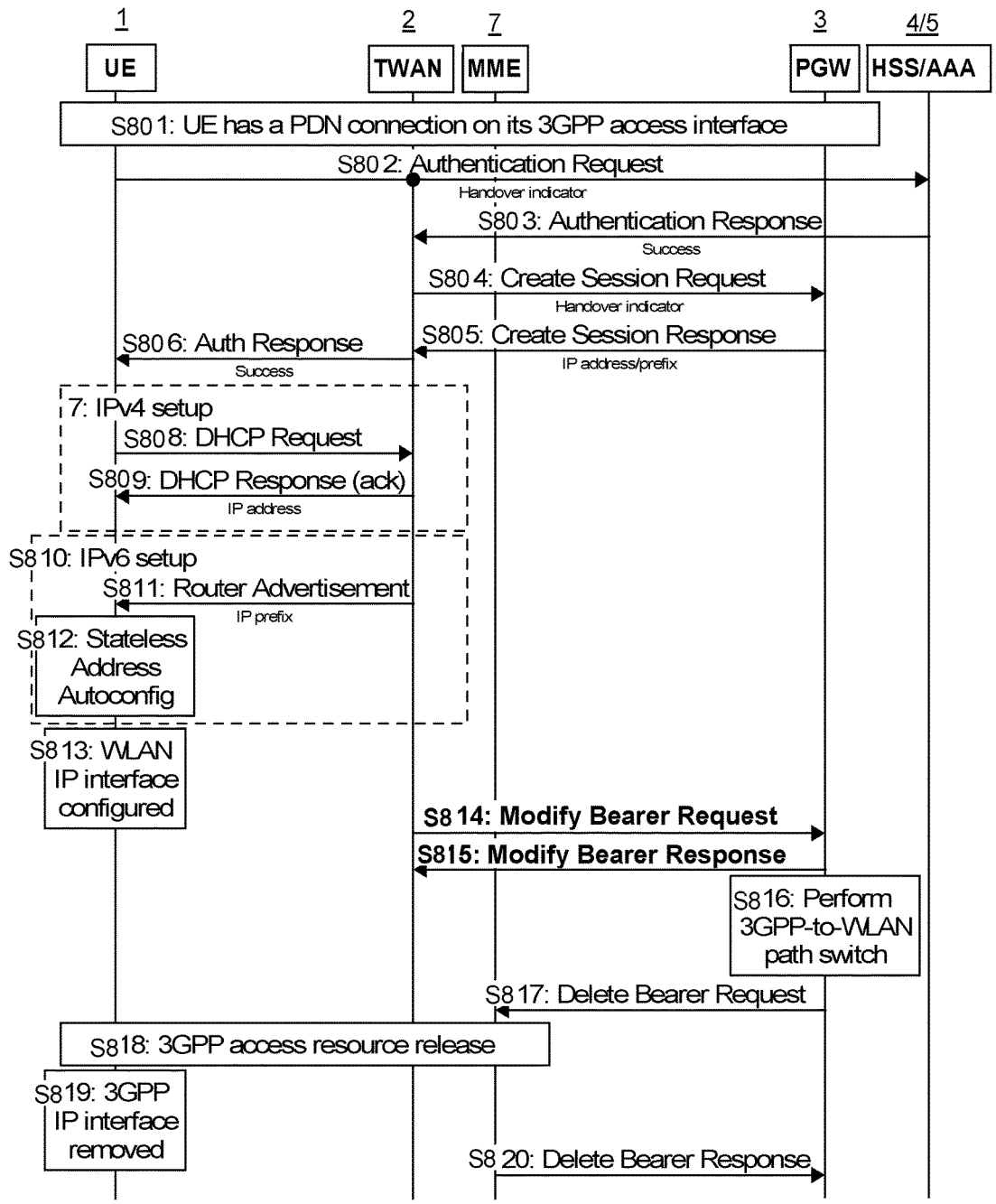
FIG. 8 illustrates schematically in a signalling diagram a handover from 3GPP to WLAN with S2a tunnel setup triggered by authentication, with TWAN informing PGW when to do path switch according to another embodiment.

According to second embodiment, the PGW 3 delays path switch and resource release in source access. During an ongoing handover, the PGW 3 may delay the path switch and resource release in the source access. FIG. 6 visualizes this. This figure is similar to FIG. 3 but with steps S606 and S616 added.

An idea with Timer A is to allow the UE 1 to receive downlink data over the source access while the target access interface is not yet configured. This may eliminate or reduce the downlink outage time.

An idea with Timer B is to ensure that step S618 occurs after step S615. This way, the interface gap time may be eliminated or reduced.

The UE 1 may use its source access interface as long as it is available. This may eliminate or reduce the uplink outage time.

An advantage of this solution may be that it may only impact the PGW 3. However, the following has to be considered when deciding a value to set the timers to, i.e. the durations of the respective timers.

If the total time period of A+B is too short, then the UE 1 may not have time to finalize step S615 before step S619. A combination with the first embodiment could limit some of the consequences of this. It should also be noted that one or more DHCP/RA signals may get lost, requiring a retransmission. It may therefore not possible to foresee how long time will be spent in blocks S609 and S612.

Suppose UE 1 initiated the handover because it gets out of LTE coverage. The UE 1 looses LTE coverage completely with Timer A still running. Then all subsequent downlink data may get lost until Timer A expires and the PGW 3 makes the path switch. Therefore, Timer A should not be set too long.

Timer A may be set to a fairly small value (e.g. 0.5 seconds). This may then eliminate the loss of downlink data in most typical deployments (assuming no retransmissions occur in steps S608-S614). Timer B may be set to a fairly large value (e.g. 10 seconds). This may eliminate the interface gap time in most cases.

In a third embodiment, PGW 3 delays path switch and resource release in source access, UE 1 notifies explicitly when configuration is done. The second embodiment in the above section may be further extended by letting the UE 1 inform the PGW 3 when IP interface configuration is finalized. This is visualized in step S715 in FIG. 7.

If the UE 1 always performs step S715, then Timer A and Timer B may not be needed anymore. The PGW 3 may acknowledge the path switch either explicitly by step S717 or implicitly by steps S719 and S720. Timer A and Timer B may still be kept for the case step S715 may be performed.

In that case, Timer A may be aborted when the PGW 3 receives step S715 while Timer A is running.

In this embodiment it may be considered what kind of signal step S715 should be. A couple of alternatives are:
  Step S715 may be a new control protocol between UE 1 and PGW 3.
  Another variant is that step S715 is an uplink user plane packet. However, it may not be foreseen when an application sends an uplink packet.
  Yet another variant is that step S715 is a user plane packet, but triggered by the UE interface chipset; e.g. a ping. However, it may be difficult to find a proper destination address for such a packet. The UE 1 may either need a means to resolve the address of the PGW 3, or it may need to assume a peer that is always available.

A variant to this solution is to let the UE 1 perform the "Inform Configuration Done" (step S715) over the 3GPP access instead. The same solution alternatives as listed above may then apply. The control protocol alternative may be done by the UE 1 performing a "PDN Disconnection Request" over the 3GPP access. Such a signal is already part of the standard and already implemented in the relevant products. However, it has to be considered that the UE 1 may have lost coverage on the 3GPP access by the time it has configured its WLAN interface. In fact, getting out of 3GPP coverage may have been the reason that the handover was initiated.

In a forth embodiment, the TWAN 2 notifies explicitly to perform path switch. Instead of the UE 1 informing the PGW 3 when the configuration is done, the TWAN 2 may indicate when to do the path switch. This is visualized in FIG. 8.

Here, the path switch (step S816) may be performed by the Modify Bearer exchange (steps S814-S815). The embodiment may be similar to the handover from WLAN to 3GPP of FIG. 5. An advantage of this approach may be that it may not impact the UE 1. Downlink data may get lost if step S816 is finalized before step S813. However, measurements indicate that this time may be negligible in normal situations.

The Modify Bearer Request (step S814) may be performed immediately after executing step S809 and/or step S811. A problem may occur in error cases when those signals are lost. The TWAN 2 may not get a confirmation from the UE 1 that those signals are really received. For IPv6, the UE 1 may perform duplicate address detection (step S812) which may result in signals visible to the TWAN 2. However, duplicate address detection is optional if the UE 1 knows that the UE-TWAN link is a point-to-point link. Furthermore, even duplicate address detection signalling may get lost. A combination with the first embodiment may solve some of the problems with consequences.

Another potential consideration is that a UE 1 may skip block S807 and block S810 entirely. It may assume that, because this is a handover, and authentication succeeded, it should get the same address on WLAN as it had on 3GPP. Alternatively, the UE skips block S807 because it already has received the address as part of the authentication signalling.

Figure 9A:
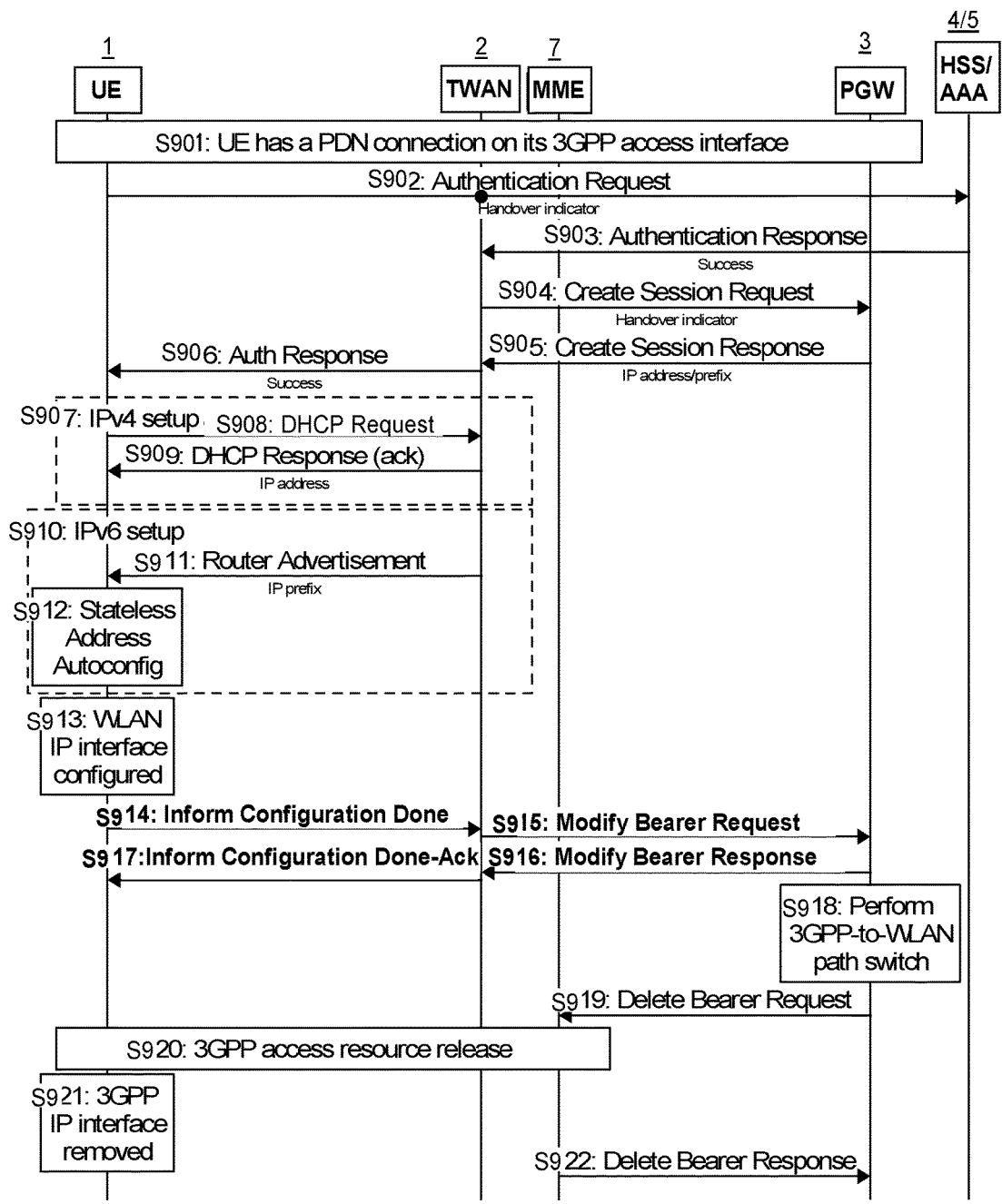
FIG. 9a illustrates schematically in a signalling diagram a handover from 3GPP to WLAN with S2a tunnel setup triggered by authentication, with TWAN informing PGW when to do path switch after explicit UE notification according to another embodiment.

In a fifth embodiment, after UE notification, TWAN 2 notifies explicitly to perform path switch. The call flow in FIG. 9 shows a combination of the previous third and fourth embodiments. Instead of the UE 1 notifying the PGW 3, it notifies the TWAN 2. This solution may further improve the embodiments of the previous section.

Candidates on what kind of signal step S914 may be are similar to those listed in the third embodiment:

Step S914 may be a new control protocol between UE 1 and TWAN 2. The message proposed in step S914 may be added to that control protocol.

Another variant is that step S914 is an uplink user plane packet originating from an application. However, it may not be foreseen when an application sends an uplink packet.

Yet another variant is that step S914 is a user plane packet, but triggered by the UE interface chipset; e.g. a ping or an ARP. If the UE 1 has performed DHCP or has received an RA, it may know the address of the TWAN 2. The packet could then be addressed to the TWAN 2.

Figure 9B:
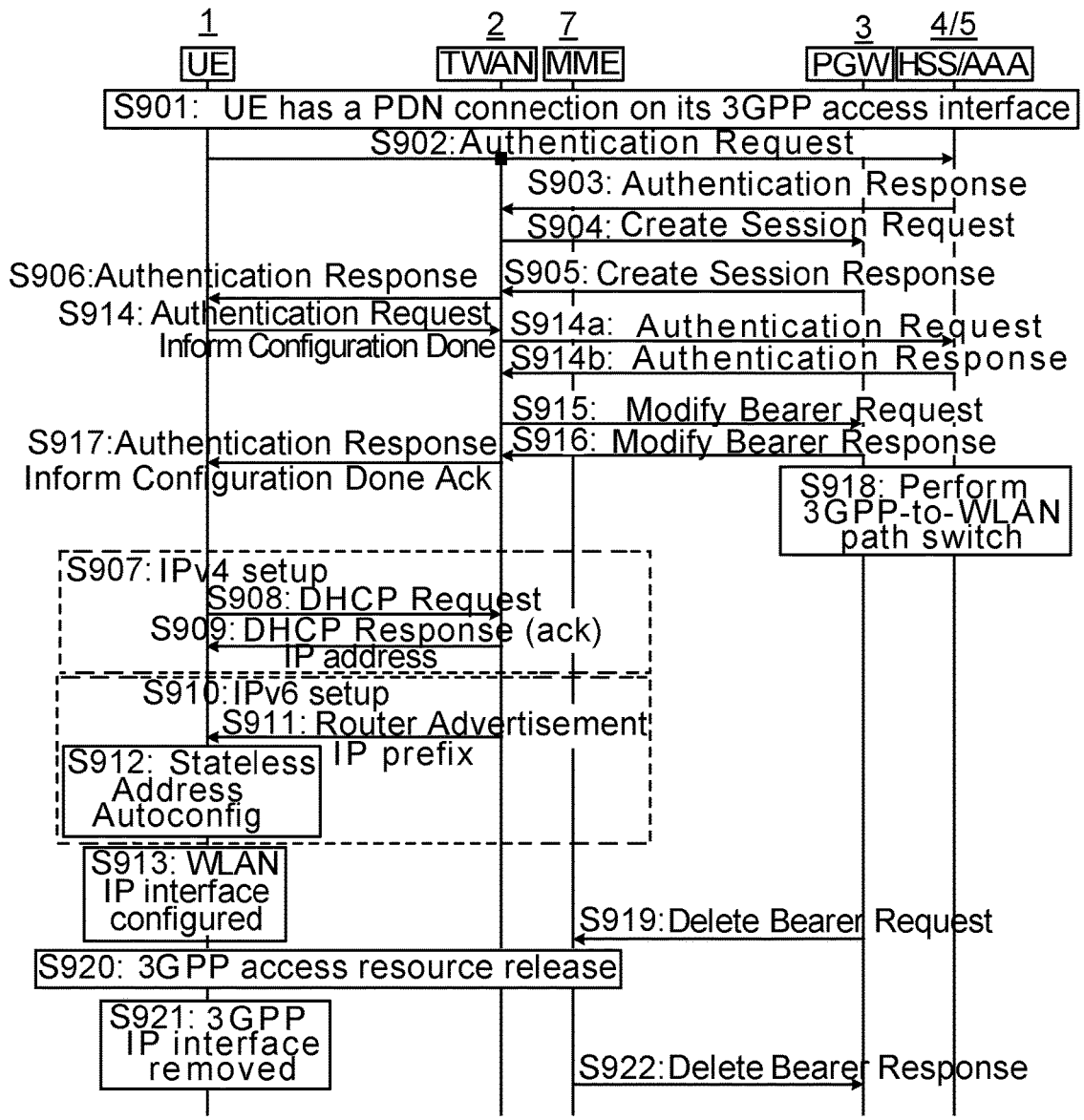
FIG. 9b illustrates schematically in a signalling diagram a handover from 3GPP to WLAN with S2a tunnel setup triggered by authentication, with TWAN informing PGW when to do path switch after explicit UE notification according to another embodiment.
Figure 10:
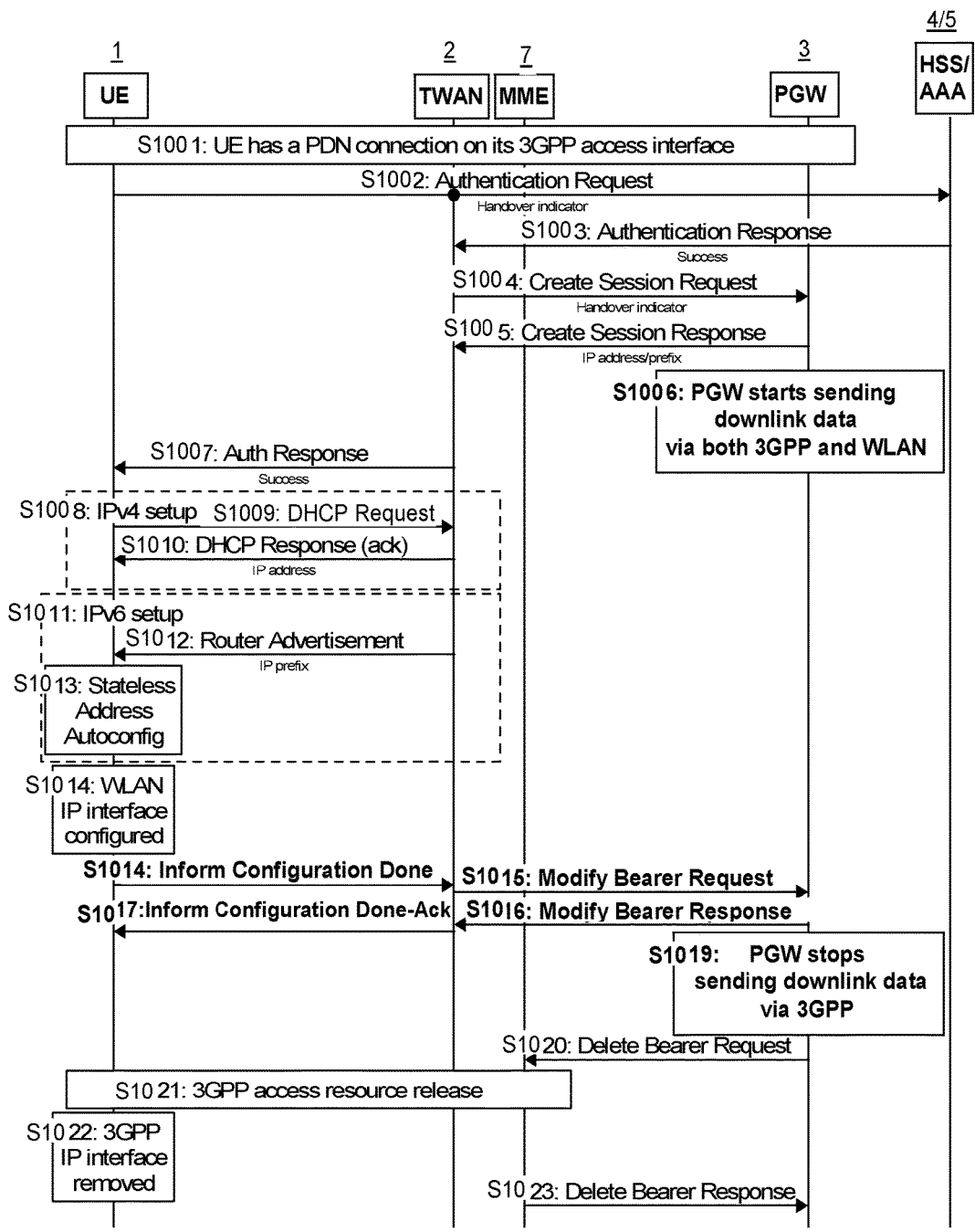
FIG. 10 illustrates schematically a signalling diagram in which allowing downlink data to be sent via two interfaces according to an exemplary embodiment.

Furthermore, messages S914 and S917 may take the form of authentication signals. In such a variant, S914 and S917 would take place after message S905 but before the IP set-ups of steps S907 and S910. This alternative is shown in FIG. 9b. Thus, a first request S902/response S903 round to triggers the Create Session Request S904, and a second request S914, S914a/response S914b round triggers the Modify Bearer Request S915.

According to a sixth embodiment, downlink data may be sent via both tunnels. The solution in the previous section may be even further optimized by enabling the PGW 3 to send downlink data via both 3GPP and WLAN. The call flow in FIG. 10 visualizes this.

An advantage of this solution is that it may give a truly seamless experience. This solution assumes that both PGW 3 and UE 1 are capable of handling downlink data over two interfaces. In particular a UE 1 may lack such capability. The solution may also introduce a waste of resources. This may, however, be acceptable since handovers may typically be performed under a short period of time.

The UE 1 may need to be prepared to take care of duplicate downlink packets. TCP/IP has built-in support for this. For other protocols, the application may need to handle duplicates. As duplicates can occur also due to other reasons, it may be assumed that applications already have the means to handle duplicates.

In a similar fashion, this embodiment may be combined with the second embodiment: "PGW delays path switch and resource release in source access", the third embodiment: "PGW delays path switch and resource release in source access, UE notifies explicitly when configuration done" and embodiment four: "TWAN notifies explicitly to perform path switch".

Second Scenario: Handover from 3GPP to WLAN, tunnel setup triggered by control protocol.

All embodiments listed above may apply as well to the scenario when handover is performed from 3GPP to WLAN and the tunnel setup is triggered by a control protocol (see FIG. 4). The following can be further clarified:

Regarding the second embodiment "PGW delays path switch and resource release in source access". In an IPv4-only environment where the IPv4 address is sent to the UE 1 by the "PDN Connection Setup Response" signal (step S408 in FIG. 4) the value of Timer A may have to be very small or even zero.

Regarding the fourth embodiment "TWAN notifies explicitly to perform path switch". In an IPv4-only environment where the IPv4 address is sent to the UE 1 by the "PDN Connection Setup Response" signal (step S408 in FIG. 4) the "Modify Bearer Request" (step S814 in FIG. 8) may be sent immediately after receiving the "Create Session Response" (step S805 in the same figure). In such case, the path switch might as well have been triggered by the "Create Session Request". However, when the IPv4 address is sent via DHCP, or when IPv6 is used, triggering the path switch via "Modify Bearer Request" may not be relevant.

Third Scenario: Handover from WLAN access to 3GPP access.

For a handover from WLAN access to 3GPP access, the following may apply.

In an IPv4-only environment where the IPv4 address is sent to the UE 1 as part of the bearer establishment (step S506 in FIG. 5), interface gap time, uplink outage time and downlink outage time may not occur. Therefore, the solutions presented in the above embodiments may not be needed.

In an environment where the IPv4 address is sent via DHCP, or when IPv6 is used, the first embodiment and the third embodiment may improve handovers from WLAN access to 3GPP access. Applying the third embodiment may be easier in this scenario. The "Inform Configuration Done" signal may be a user plane signal like ping or ARP. Since the PGW 3 may be the first-hop router, such a signal may be addressed to the PGW 3.

Figure 11:
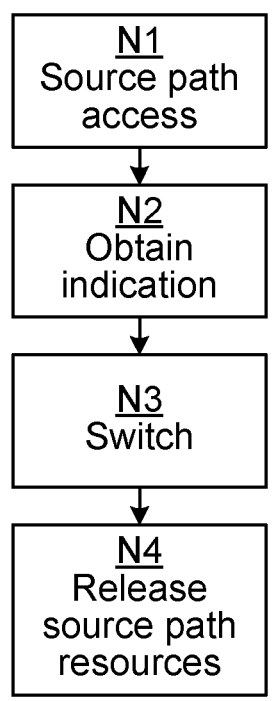
FIG. 11 is a schematic flow chart of an embodiment of a method of a network node in accordance with the present disclosure.

FIG. 11 illustrates in more general terms an embodiment of a handover method performed in a network node, e.g. the PGW 3, in the communication network. The network node provides N1 IP access to the UE 1 via a source access path, e.g. a 3GPP or WLAN RAT. The network node obtains N2 an indication that the UE 1 has configured a communication interface for a target access path, typically while the network node is still providing N1 IP access via the source access path. In response to the obtained N2 indication, the network node then switches N3 from the providing N1 IP access via the source access path to providing IP access to the UE 1 via the target access path, e.g. a 3GPP or WLAN RAT. Then, the network node sends N4 instructions (e.g. to the UE 1, the MME 7 and/or the TWAN 3) for releasing communication resources for the source access path, after the obtaining N2 an indication that the communication interface has been configured for the target access path. In other embodiments, the method discussed with reference to FIG. 11 is spread over several network nodes in the communication network.

Figure 12:
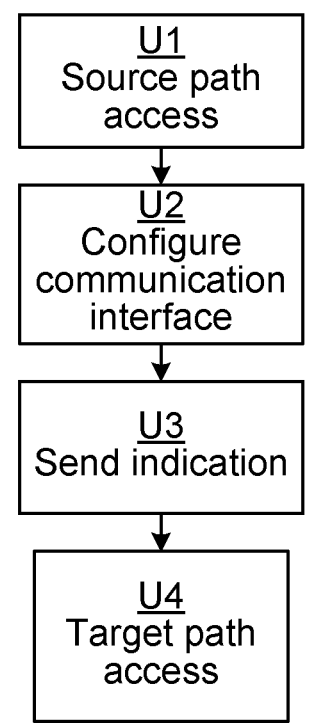
FIG. 12 is a schematic flow chart of an embodiment of a method of a UE in accordance with the present disclosure.

FIG. 12 illustrates in general terms an embodiment of a handover method performed in a UE 1 served by the communication network. The UE is provided with (has) U1 an IP access via the source access path, e.g. a 3GPP or WLAN RAT. While still having U1 the IP access via the source access path, the UE configures U2 its communication interface for the target access path. Then, when the communication interface has been configured U2 for the target access path, the UE sends U3 an indication that the communication interface has been configured U2 for the target access path, to a network node of the communication network, e.g. the PGW 3 or the TWAN 2. The UE then obtains U4 IP access via the target access path after having sent U3 the indication, typically as a result of the communication network having acted upon the send U3 indication S715, S914 or S1014.

Figure 13:
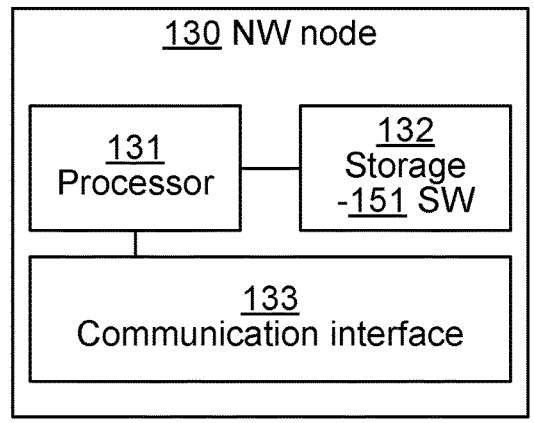
FIG. 13 is a schematic block diagram of an embodiment of a network node of the present disclosure.

FIG. 13 schematically illustrates an embodiment of a network (NW) node 130, e.g. the PGW 3, or comprised or otherwise associated in the PGW 3, of the present disclosure. The NW node 130 comprises processor circuitry 131 e.g. a central processing unit (CPU). The processor circuitry 131 may comprise one or a plurality of processing units in the form of microprocessor(s). However, other suitable devices with computing capabilities could be comprised in the processor circuitry 131, e.g. an application specific integrated circuit (ASIC), a field programmable gate array (FPGA) or a complex programmable logic device (CPLD). The processor circuitry 131 is configured to run one or several computer program(s) or software 151 (see also FIG. 15) stored in a storage 132 of one or several storage unit(s) e.g. a memory. The storage unit is regarded as a computer readable means 152 as discussed herein (see FIG. 15) and may e.g. be in the form of a Random Access Memory (RAM), a Flash memory or other solid state memory, or a hard disk, or be a combination thereof. The processor circuitry 131 is also configured to store data in the storage 132, as needed. The NW node 130 also comprises a communication interface 133 e.g. for communication with other nodes in the communication network and the UE 1, e.g. comprising a transmitter and a receiver, which may be combined to form a transceiver or be present as distinct units within the NW node 130.

Figure 14:
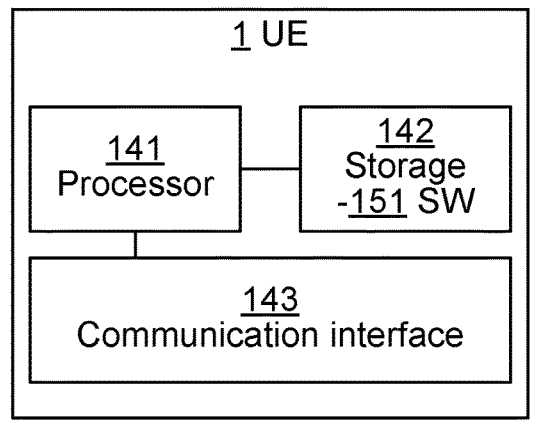
FIG. 14 is a schematic block diagram of an embodiment of a UE of the present disclosure.

FIG. 14 schematically illustrates an embodiment of a UE 1 of the present disclosure. The UE 1 comprises processor circuitry 141 e.g. a central processing unit (CPU). The processor circuitry 141 may comprise one or a plurality of processing units in the form of microprocessor(s). However, other suitable devices with computing capabilities could be comprised in the processor circuitry 141, e.g. an application specific integrated circuit (ASIC), a field programmable gate array (FPGA) or a complex programmable logic device (CPLD). The processor circuitry 141 is configured to run one or several computer program(s) or software 151 (see also FIG. 15) stored in a storage 142 of one or several storage unit(s) e.g. a memory. The storage unit is regarded as a computer readable means 152 as discussed herein (see FIG. 15) and may e.g. be in the form of a Random Access Memory (RAM), a Flash memory or other solid state memory, or a hard disk, or be a combination thereof. The processor circuitry 141 is also configured to store data in the storage 142, as needed. The UE 1 also comprises a communication interface 143 e.g. a radio interface, for communication with nodes in the communication network, e.g. comprising a transmitter and a receiver, which may be combined to form a transceiver or be present as distinct units within the UE 1. The communication interface 143 may be configured for the source access path and/or the target access path, as discussed herein. The UE 1 may be a radio device, i.e. any device or UE, mobile or stationary, enabled to communicate over a radio cannel in the communications network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

Figure 15:
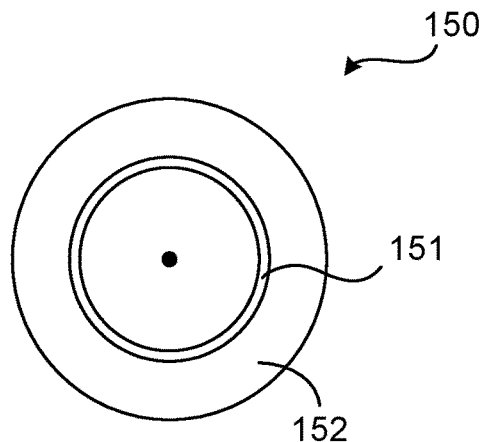
FIG. 15 illustrates an embodiment of a computer program product of the present disclosure.

FIG. 15 illustrates a computer program product 150. The computer program product 150 comprises a computer readable medium 152 comprising a computer program 151 in the form of computer-executable components 151. The computer program/computer-executable components 151 may be configured to cause a device, such as the network node 130 or the UE 1, e.g. as discussed herein, to perform an embodiment of a method of the present disclosure. The computer program/computer-executable components may be run on the processor circuitry 131/141 of the device 130/1 for causing the device to perform the method. The computer program product 150 may e.g. be comprised in a storage unit or memory 132/142 comprised in the device and associated with the processor circuitry. Alternatively, the computer program product 150 may be, or be part of, a separate, e.g. mobile, storage means, such as a computer readable disc, e.g. CD or DVD or hard disc/drive, or a solid state storage medium, e.g. a RAM or Flash memory.

In some embodiments of the present disclosure, the network node obtaining N2 an indication comprises receiving a message S715, S814, S915 or S1015, e.g. an inform configuration done message such as a control protocol message, a user plane packet or a ping, from the UE 1 or from another node in the communication network such as the TWAN 2.

Similarly, in some embodiments of the present disclosure, the UE 1 sending U3 an indication that the communication interface 143 has been configured U2 for the target access path comprises sending a message S715, S914 or S1014.

In some embodiments of the present disclosure, the switching N3 comprises providing IP access via both the source access path and the target access path during a period of time before providing IP access via only the target access path prior to the sending N4 instructions for releasing communication resources for the source access path.

The present disclosure sets out steps performed at (and means or apparatus or a processor or a transmitter/receiver for performing those steps in) a node 130 such as a Packet Data Network Gateway node 3 in the 3GPP access network, to step performed at (and means or apparatus or a processor or a transmitter/receiver for performing those steps in) a Trusted WLAN Access Network node, e.g. a TWAG 2, and to steps performed at (and means or apparatus or a processor or a transmitter/receiver for performing those steps in) a UE 1.

A computer program 151 is also proposed for controlling an apparatus 130, 3, 2 or 1 to perform a method as herein proposed, or which, when loaded into an apparatus, causes the apparatus to become an apparatus as herein proposed. The program may be carried on a carrier medium 152. The carrier medium may be a storage medium. The carrier medium may be a transmission medium. An apparatus programmed by such a program is also envisaged, as is a storage medium containing such a program.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Below follow some other aspects of the present disclosure.

According to an aspect of the present disclosure, there is provided a method of handling handover of a User Equipment's 1 access from a first access to a second access in a communications network, the method comprising, at a network node 130, such as a Packet Data Network Gateway node (PGW) 3, during an ongoing handover, to delay path switch, for example 3GPP to WLAN path switch.

According to another aspect of the present disclosure, there is provided a network node 130 for a communication network. The network node comprises means (e.g. the processor circuitry 131, in some embodiments in cooperation with the communication interface 133 for sending instructions within the communication network) for providing N1 IP access to the UE 1 via the source access path. The network node also comprises means (e.g. the processor circuitry 131, in some embodiments in cooperation with the communication interface 133) for obtaining N2 an indication that the UE 1 has configured a communication interface 143 for the target access path. The network node also comprises means (e.g. the processor circuitry 131, in some embodiments in cooperation with the communication interface 133 for sending instructions within the communication network) for switching N3 from the providing N1 IP access via the source access path to providing IP access to the UE 1 via the target access path. The network node also comprises means (e.g. the processor circuitry 131 in cooperation with the communication interface 133) for sending N4 instructions for releasing communication resources for the source access path, after the obtaining N2 an indication that the communication interface has been configured for the target access path.

According to another aspect of the present disclosure, there is provided a UE 1 comprising means (e.g. the processor circuitry 141 in cooperation with the communication interface 143) for having U1 IP access via the source access path. The UE also comprises means (e.g. the processor circuitry 141 in cooperation with the communication interface 143) for configuring U2 a communication interface 143 of the UE 1 for the target access path while still having U1 the IP access via the source access path. The UE also comprises means (e.g. the processor circuitry 141 in cooperation with the communication interface 143) for sending U3 an indication that the communication interface 143 has been configured U2 for the target access path, to a network node 130 of the communication network. The UE also comprises means (e.g. the processor circuitry 141 in cooperation with the communication interface 143) for obtaining U4 IP access via the target access path after having sent U3 the indication.

According to another aspect of the present disclosure, there is provided a computer program product 150 comprising computer-executable components 151 for causing a UE 1 in a communication network to perform an embodiment of a method of the present disclosure when the computer-executable components 151 are run on processor circuitry 141 comprised in the UE 1.

According to another aspect of the present disclosure, there is provided a computer program 151 for facilitating handover in a communication network of a UE 1 from access via a source access path to access via a target access path. The computer program comprises computer program code which is able to, when run on processor circuitry 141 of a UE 1, cause the UE to have U1 IP access via the source access path. The code is also able to cause the UE 1 to configure U2 a communication interface 143 of the UE 1 for the target access path while still having U1 the IP access via the source access path. The code is also able to cause the UE 1 to send U3 an indication that the communication interface 143 has been configured U2 for the target access path, to a network node 130 of the communication network. The code is also able to cause the UE 1 to obtaining U4 IP access via the target access path after having sent U3 the indication.

Below follow some more specific embodiments of the present disclosure.

According to a first embodiment, there is provided a method of handling handover of a User Equipment's access from a first access to a second access in a communications network. The method comprises, at a User Equipment 1 during an ongoing handover, to delay informing a high-level operating system of the ongoing handover.

As an option, the first access is a 3GPP (cellular) access and the second access is a Wireless Local Access Network (WLAN) access, such that the method comprises, for example, a handover of a User Equipment's 3GPP access to a WLAN access when Sea tunnel setup is triggered by authentication.

According to a second embodiment, there is provided a method of handling handover of a User Equipment's 1 access from a first access to a second access in a communications network. The method comprises at a network node 130, such as a Packet Data Network Gateway node (PGW) 3, during an ongoing handover, delaying path switch, e.g. 3GPP to WLAN path switch. Additionally the method may comprise at the network node delaying resource release in the first access.

As an option, the first access is a 3GPP access and the second access is a WLAN access, such that the method comprises, for example, a handover of a User Equipment's 3GPP access to a WLAN access when Sea tunnel setup is triggered by authentication.

As an option, a delaying path switch is realized by providing a first timer A in the network node 130. The timer value of the first timer is suitably set to allow the UE 1 to receive downlink data over the first access while the second access interface is not yet configured. As a further option, delaying resource release is realized by providing a second timer B in the network node 130. The timer value of the second timer is suitably set to ensure that the first access resource release N4 occurs after the second access interface 143 is configured U2 in the UE 1.

According to a third embodiment, there is provided a method of handling handover of a User Equipment's 1 access from a first access to a second access in a communications network. The method comprises at a network node 130, such as a Packet Data Network Gateway node (PGW) 3, during an ongoing handover, receiving N2 from a User Equipment 1 an indication S715 that the configuration of the second access interface 143 is completed. The network node 130 may send an acknowledge S717 to the User Equipment 1 in response to the indication that the configuration of the second access interface is completed.

As an option, the first access is a 3GPP access and the second access is a WLAN access, such that the method comprises, for example, a handover of a User Equipment's 3GPP access to a WLAN access when S2a tunnel setup is triggered by authentication.

As an option, the method additionally comprises, at the network node 130, delaying path switch, e.g. 3GPP to WLAN path switch. This may be realized by providing a first timer A in the network node 130. The timer value of the first timer is suitably set to allow the UE 1 to receive downlink data over the first access while the second access interface is not yet configured. As a further option the method additionally comprises, at the network node 130, delaying resource release in the first access. This may be realized by providing a second timer B in the network node 130. The timer value of the second timer is suitably set to ensure that the first access resource release N4 occurs after the second access interface is configured U2 in the UE.

According to a fourth embodiment, there is provided a method of handling handover of a User Equipment's 1 access from a first access to a second access in a communications network. The method comprises at a network node 130, such as a Packet Data Network Gateway node (PGW) 3, during an ongoing handover, receiving from a Trusted WLAN Access Network (TWAN) 2 a request to modify bearer S814. The network node 130 sends a response S815 to the modify bearer request. The path switch, e.g. 3GPP to WLAN path switch, is performed N3 after said modify bearer exchange.

As an option, the first access is a 3GPP access and the second access is a WLAN access, such that the method comprises, for example, a handover of a User Equipment's 3GPP access to a WLAN access when S2a tunnel setup is triggered by authentication.

As an option, the method additionally comprises, at the network node 130, to start sending downlink data via both 3GPP and WLAN. This step is followed by, at the network node, after receiving said request S814 to modify bearer to stop sending downlink data via the 3GPP path.

According to a fifth embodiment, there is provided a method of handling handover of a User Equipment's 1 access from a first access to a second access in a communications network. The method comprises, at a User Equipment (UE) 1, during an ongoing handover, sending U3 to a network node 130, e.g. a PGW 3, an indication S914 that the configuration U2 of the second access interface 143 is completed such that the network node 130 may perform 3GPP to WLAN path switch N3. Additionally, the UE 1 may receive an acknowledgement S917 from the network node 130, wherein the network node confirms reception of said indication.

Alternatively, the method comprises, at a User Equipment (UE) 1, during an ongoing handover, sending U3 to a TWAN 2, an indication S914 that the configuration U2 of the second access interface 143 is completed. Such an indication may result in a request to modify bearer S915 from the TWAN 2 to the network node 130 triggering the node to perform 3GPP to WLAN path switch N3.

As an option, the first access is a 3GPP access and the second access is a WLAN access, such that the method comprises, for example, a handover of a User Equipment's 3GPP access to a WLAN access when S2a tunnel setup is triggered by authentication.

The following are some of the abbreviations used in this disclosure:
3GPP 3rd Generation Partnership Project
AAA 3GPP Authentication, Authorization and Accounting server
AP Access Point
DHCP Dynamic Host Configuration Protocol
EPC Evolved Packet Core
GGSN Gateway GPRS Support Node
GPRS General Packet Radio Service
GTP GPRS Tunneling Protocol
HSS Home Subscriber Server
IEEE Institute of Electrical and Electronics Engineering
IP Internet Protocol
IPv4 IP version 4
IPv6 IP version 6
LAN Local Area Network
LTE Long-term Evolution
MME Mobility Management Entity
PDN Packet Data Network
PGW PDN Gateway
SaMOG Study on S2a Mobility based On GTP & WLAN access to EPC
TWAG Trusted WLAN Access Gateway
TWAN Trusted WLAN Access Network
UE User Equipment
UMTS Universal Mobile Telecommunications System
WLAN Wireless LAN The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method in a communication network for facilitating handover of a user equipment (UE) from access via a source access path to access via a target access path, the method comprising:
   providing internet protocol (IP) access to the UE via the source access path;
   obtaining an indication that the UE has configured a communication interface for the target access path;
   switching from providing the IP access via the source access path to providing the IP access to the UE via the target access path, wherein the switching is performed in response to an expiry of a first time period, wherein the first time period is a time frame to enable the UE to receive downlink data over the source access while the target access interface is being configured;
   delaying a release of communication resources for the source access path by a second time period; and
   after obtaining the indication that the communication interface has been configured for the target access path and when the second time period is expired, sending instructions for releasing communication resources for the source access path.

2. The method of claim 1, wherein the method is performed by a packet data network gateway (PGW) in the communication network.

3. The method of claim 1, wherein obtaining the indication comprises receiving at least one of: a control protocol message, a user plane packet or a ping, from the UE.

4. The method of claim 1, wherein the source access path is a cellular telecommunication access path and the target access path is a wireless local area network (WLAN) access path, or the source access path is a WLAN access path and the target access path is a cellular telecommunication access path.

5. The method of claim 4, wherein obtaining the indication comprises receiving a request for bearer modification from a trusted WLAN access network (TWAN).

6. The method of claim 1, wherein the switching comprises:
   providing the IP access via both the source access path and the target access path during a period of time; and
   providing the IP access via only the target access path prior to the sending instructions for releasing communication resources for the source access path.

7. The method of claim 1, wherein the handover is triggered by an authentication request from the UE, or by a control protocol.

8. A non-transitory computer readable medium storing a computer program comprising program instructions that, when executed by processor circuitry in a network node configured for operation in a communication network, configure the network node to facilitate handover of a user equipment (UE) from access via a source access path to access via a target access path, the computer program comprising program instructions that configure the network node to:
   provide internet protocol (IP) access to the UE via the source access path;
   obtain an indication that the UE has configured a communication interface for the target access path;
   switch from providing the IP access via the source access path to providing the IP access to the UE via the target access path, wherein the switching is performed in response to an expiry of a first time period, wherein the first time period is a time frame to enable the UE to receive downlink data over the source access while the target access interface is being configured;

delay a release of communication resources for the source access path by a second time period; and after obtaining the indication that the communication interface has been configured for the target access path and when the second time period is expired, send instructions for releasing communication resources for the source access path.

9. A network node configured for operation in a communication network, the network node comprising:

processor circuitry; and a storage unit storing instructions that, when executed by the processor circuitry, cause the network node to:

provide internet protocol (IP) access to a user equipment (UE) via a source access path;

obtain an indication that the UE has configured a communication interface for a target access path;

switch from providing the IP access via the source access path to providing the IP access to the UE via the target access path, wherein the switching is performed in response to an expiry of a first time period, wherein the first time period is a time frame to enable the UE to receive downlink data over the source access while the target access interface is being configured;

delay a release of communication resources for the source access path by a second time period; and after obtaining the indication that the communication interface has been configured for the target access path and when the second time period is expired, send instructions for releasing communication resources for the source access path.

10. The network node of claim 9, wherein the network node is configured to operate as packet data network gateway (PGW) in the communication network.

11. A method performed by a user equipment (UE) that is served by a communication network, for facilitating handover of the UE from access via a source access path to access via a target access path, the method comprising:

using the source access path for IP access;

configuring a communication interface of the UE for the target access path while still using the source access path for the IP access;

sending an indication that the communication interface has been configured for the target access path, to a network node of the communication network, wherein the network node switches from providing the IP access via the source access path to providing the IP access to the UE via the target access path, wherein the switching is performed in response to an expiry of a first time period, wherein the first time period is a time frame to enable the UE to receive downlink data over the source access while the target access interface is being configured, delaying a release of communication resources for the source access path for the IP access by a second time period, and after obtaining the indication that the communication interface has been configured for the target access path and when the second time period is expired, send instructions for releasing communication resources for the source access path; and using the target access path for the IP access, after having sent the indication.

12. A user equipment (UE) comprising:

processor circuitry;

a communication interface; and a storage unit storing instructions that, when executed by the processor circuitry, cause the UE to:

use a source access path for IP access;

configure the communication interface of the UE for a target access path while still using the source access path for the IP access send an indication that the communication interface has been configured for the target access path, to a network node of the communication network, wherein the network node switches from providing the IP access via the source access path to providing the IP access to the UE via the target access path, wherein the switching is performed in response to an expiry of a first time period, wherein the first time period is a time frame to enable the UE to receive downlink data over the source access while the target access interface is being configured, delay a release of communication resources for the source access path for the IP access by a second time period, and after obtaining the indication that the communication interface has been configured for the target access path and when the second time period is expired, send instructions for releasing communication resources for the source access path; and use the target access path for the IP access, after having sent the indication.

* * * * *